July 19, 1966 J. E. HICKERSON 3,261,445

TAPE CONTROLLED TYPEWRITER

Original Filed March 15, 1962 9 Sheets-Sheet 1

INVENTOR
JOHN E. HICKERSON

BY Ralph C. Dustin
ATTORNEY.

July 19, 1966 J. E. HICKERSON 3,261,445

TAPE CONTROLLED TYPEWRITER

Original Filed March 15, 1962 9 Sheets-Sheet 4

July 19, 1966 J. E. HICKERSON 3,261,445

TAPE CONTROLLED TYPEWRITER

Original Filed March 15, 1962 9 Sheets-Sheet 6

July 19, 1966 J. E. HICKERSON 3,261,445

TAPE CONTROLLED TYPEWRITER

Original Filed March 15, 1962 9 Sheets-Sheet 7

July 19, 1966 J. E. HICKERSON 3,261,445

TAPE CONTROLLED TYPEWRITER

Original Filed March 15, 1962

9 Sheets-Sheet 9

3,261,445
TAPE CONTROLLED TYPEWRITER

John E. Hickerson, Lexington, Ky., assignor to International Business Machines Corporation, Armonk, N.Y., a corporation of New York Continuation of application Ser. No. 179,906, Mar. 15, 1962. This application July 1, 1965, Ser. No. 470,333
13 Claims. (Cl. 197—20)

This application is a continuation of my co-pending application, Serial Number 179,906, filed March 15, 1962, and now abandoned. Some of the structure employed herein is similar to that disclosed in my copending Patent No. 3,050,241, entitled "Typewriter Tape Punch With Automatic Letters-Figures Shift."

This invention relates to typewriter-tape machines, and more particularly to mechanisms which effect an operation of a typewriter in response to a source of character representative data in a code form characterized by the absence of shift codes, for causing the typewriter to automatically shift its case position before typing each time when the source character read in the tape is in a case different from that of the previous character.

In any mechanism which operates a typewriter in response to the reading of information from a tape, it is usually necessary that the mechanism be adapted to read the information in one code and then convert it to a code to which the typewriter responds. It is also necessary that the mechanism cause the typewriter to shift its case position when the character read in the tape is in a case different from that of the character previously read. This requires that the typing of the character for which a case shift is necessary be stored until the case shifting of the typewriter has been effected.

An object of this invention is to provide an improved mechanism for reading coded information in a tape, converting it to a code to which a typewriter responds, and causing operation of the typewriter to type the information.

Another object is to provide an improved mechanism which reads characters serially in coded form, sets up control elements corresponding to each character read and, at the same time, determines if the character is of the same case as that of the character previously read. If there has been no change in the case of the characters, the control elements are operated immediately to cause actuation of a typewriter to print the last character. When a change in case has been detected, means are operated to shift the case position of the typewriter and then the control elements are actuated to effect typing.

Yet another object is to provide an improved mechanism for operating a typewriter from the reading of coded information, the mechanism operating when a character read differs in case from its preceding character to cause case shift by the typewriter and then a printing of the character.

The foregoing and other objects, features and advantages of the invention will be apparent from the following more particular description of the preferred embodiment of the invention, as illustrated in the accompanying drawings.

Figure 3A:
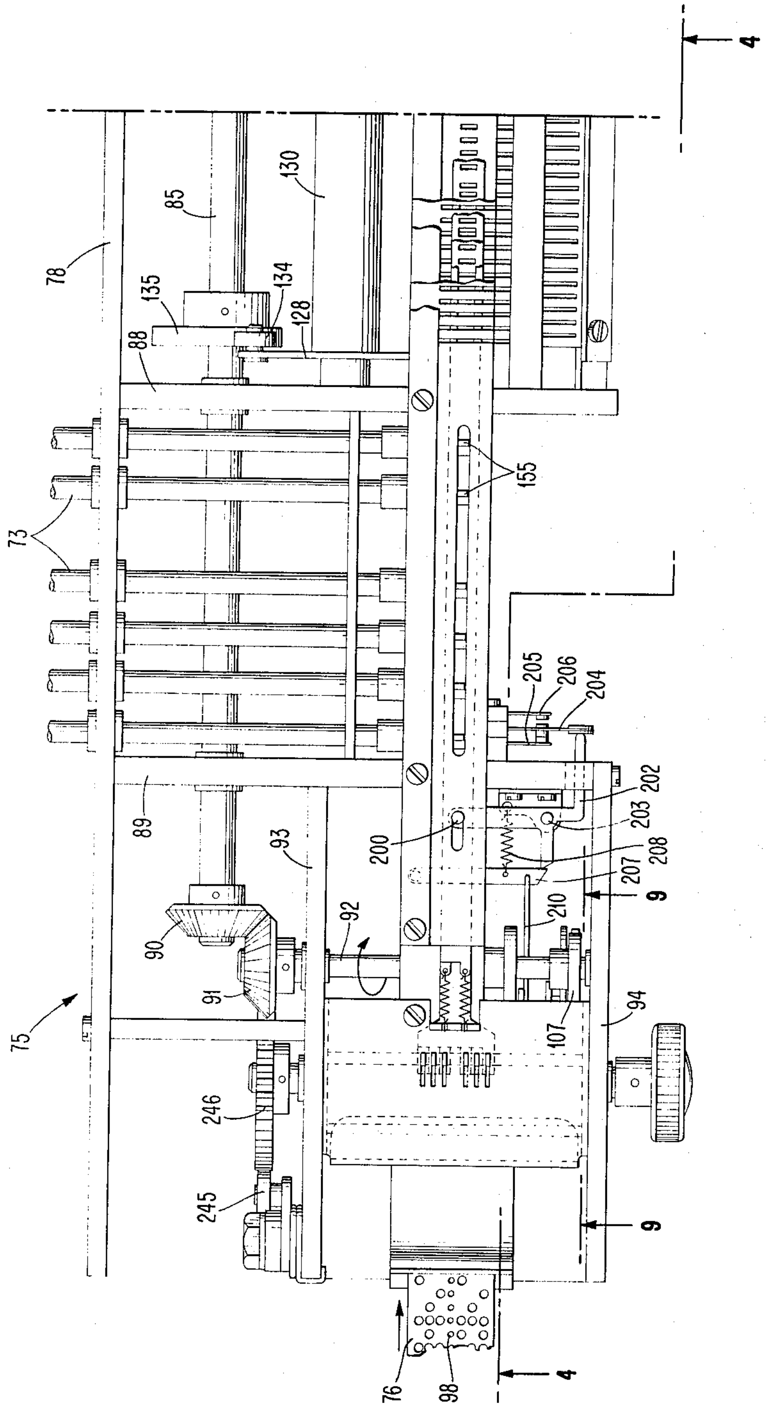
Figure 3B:
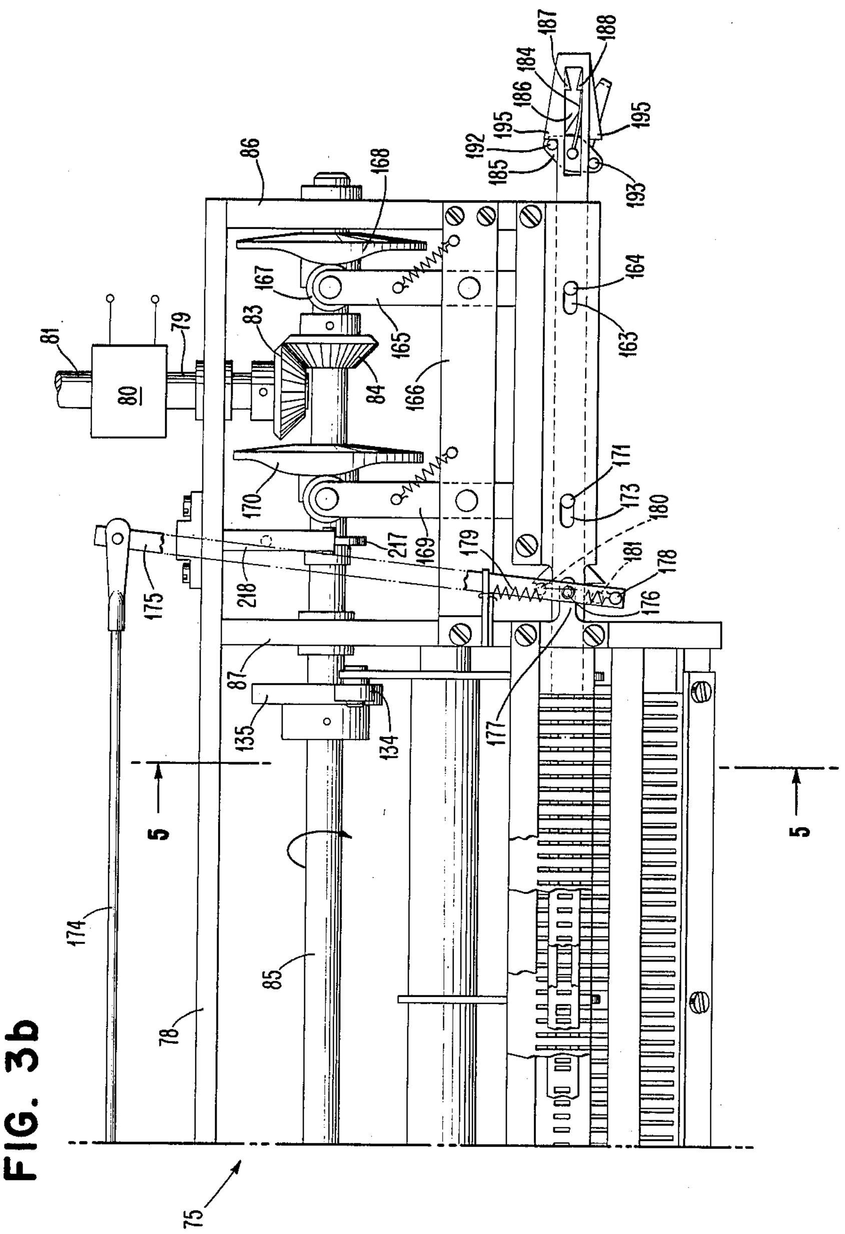
Figure 4A:
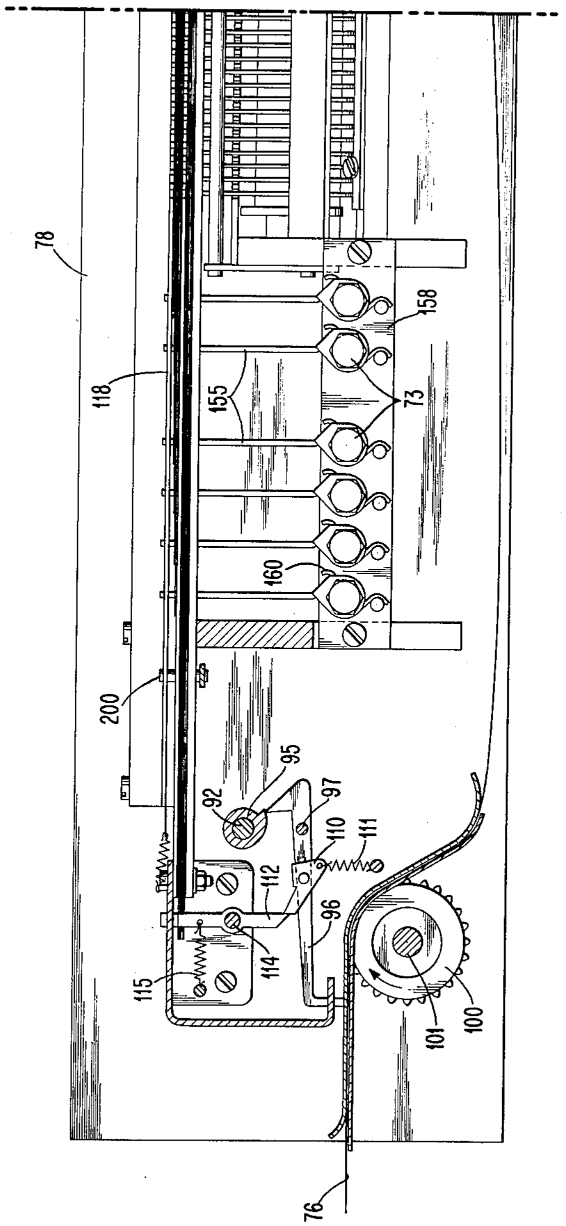
Figure 4B:
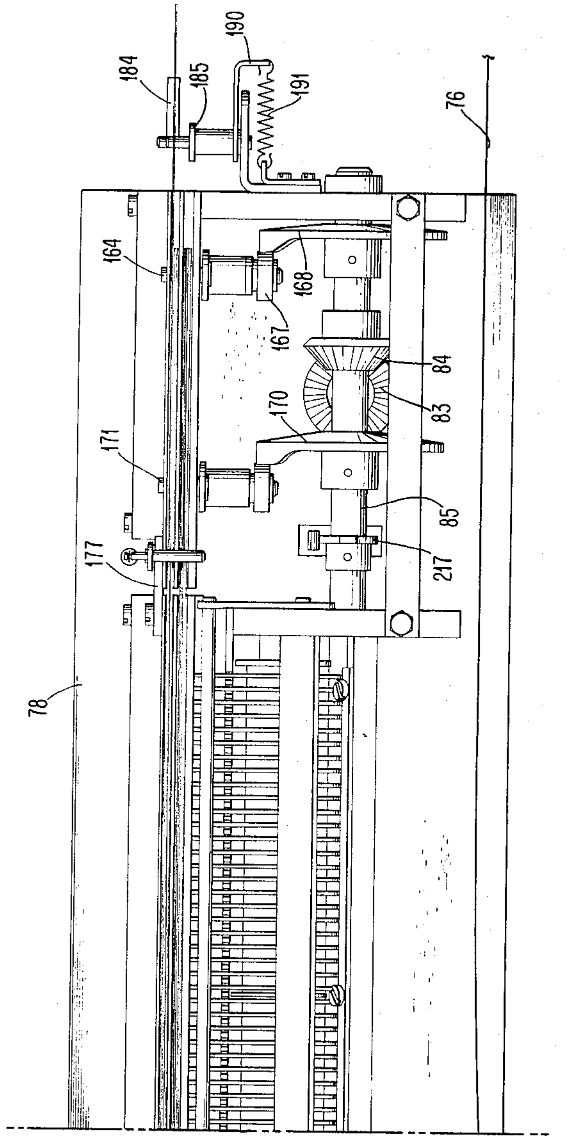
Figure 5:
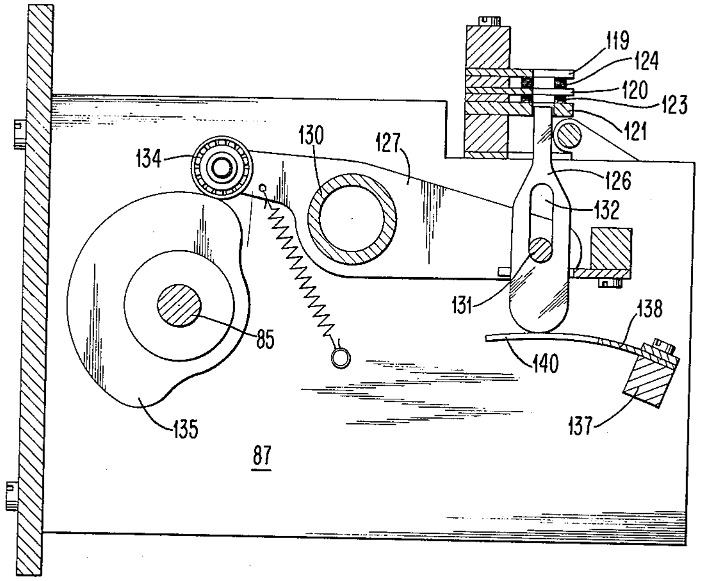
Figure 10:
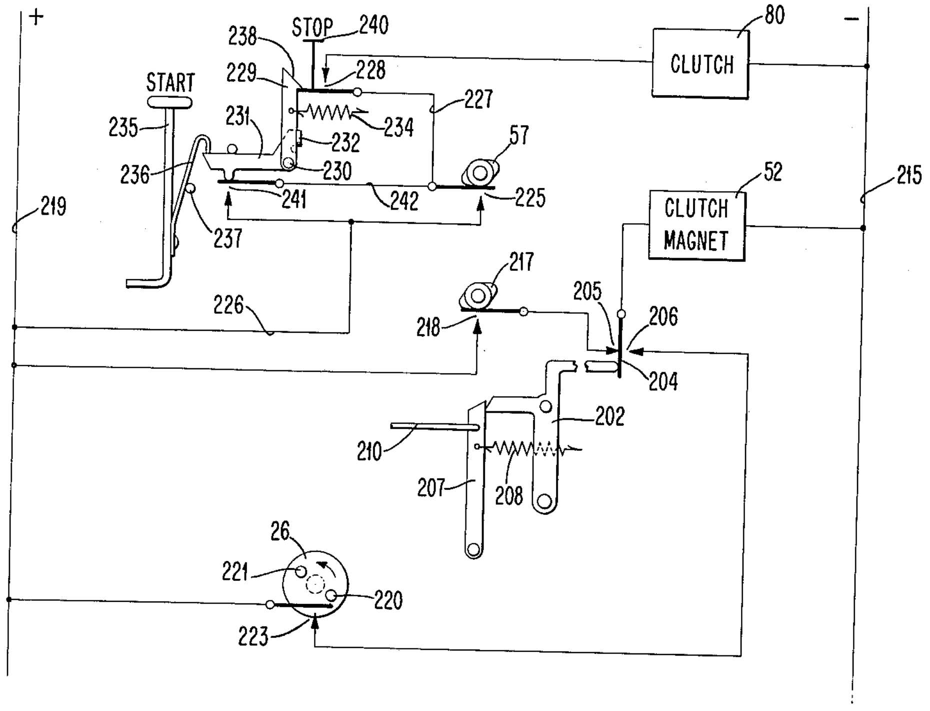
Figure 6:
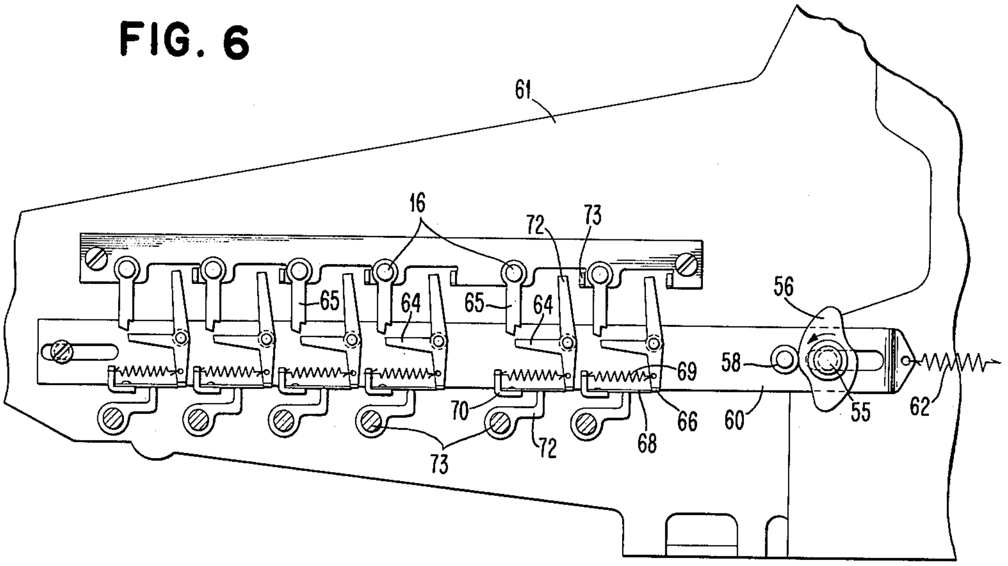
Figure 7:
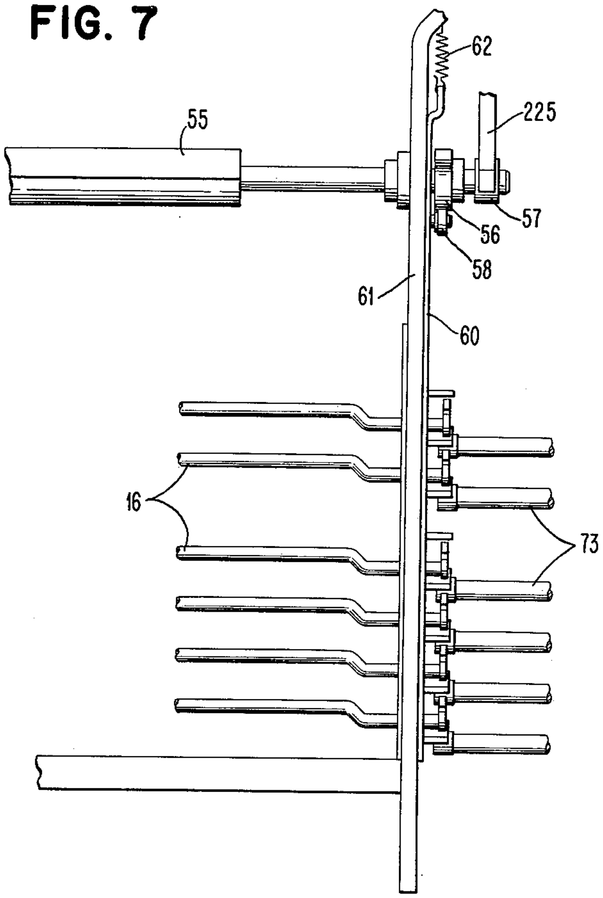
Figure 8A:
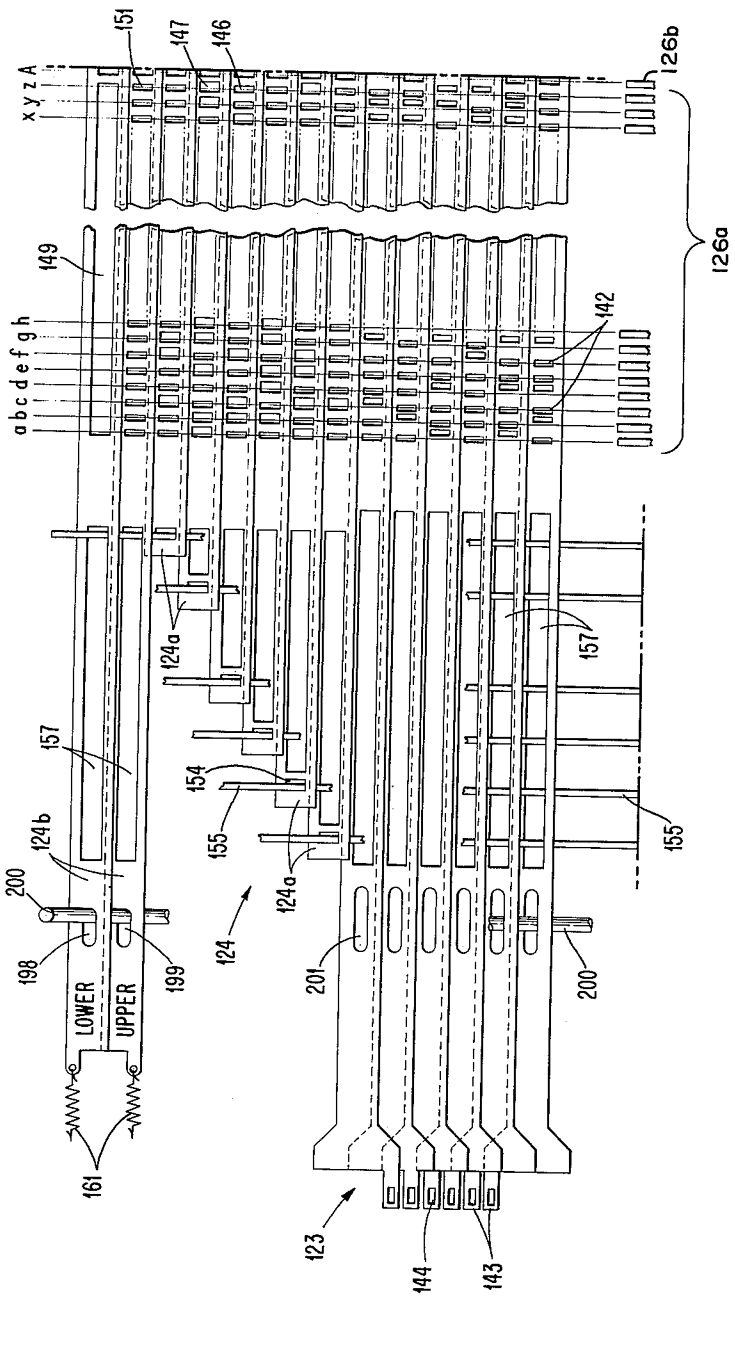
Figures 8B, 9:
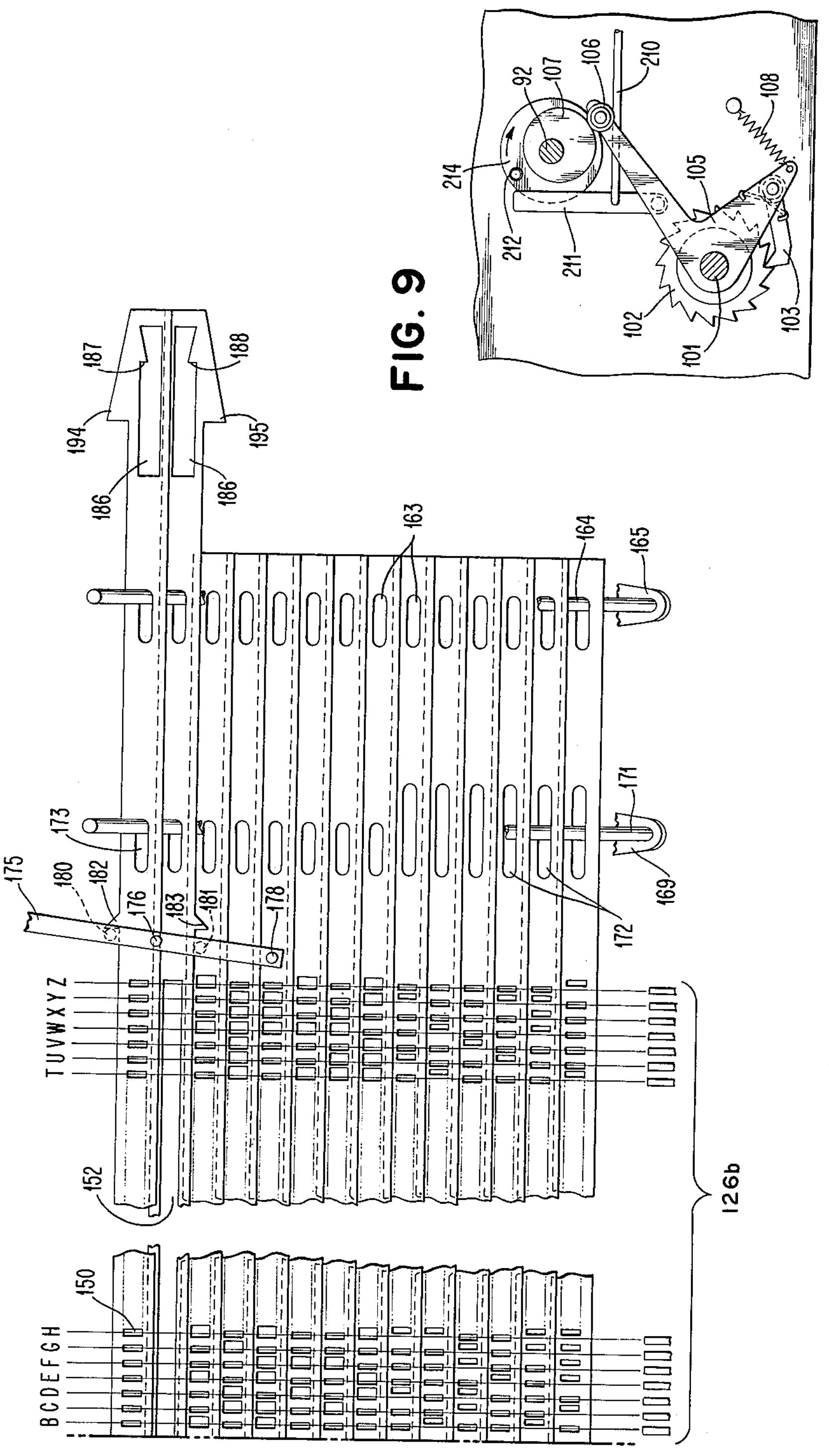

FIGURES 3*a* and 3*b*, taken together, form a plan view of the improved mechanism for controlling operations of the typewriter in response to the reading of a punched tape;

FIGURES 4*a* and 4*b* form a side elevational view, with parts shown in section along the line 4—4 in FIGURE 3*a*, of the mechanism in FIGURES 3*a* and 3*b*;

FIGURE 5 is a vertical sectional view taken on the line 5—5 on FIGURE 3*b*;

FIGURE 6 is a vertical view of the right, front side portion of the typewriter with controls associated therewith;

FIGURE 7 is a plan view of the mechanism shown in FIGURE 6;

FIGURES 8*a* and 8*b* together show a developed plan view of elongated slides used in the mechanism of FIGURES 4*a* and 4*b*;

FIGURE 9 is a view taken on the plane of the line 9—9 in FIGURE 3*a* showing a mechanism for feeding the punched tape;

FIGURE 10 is a circuit diagram.

Figure 1:
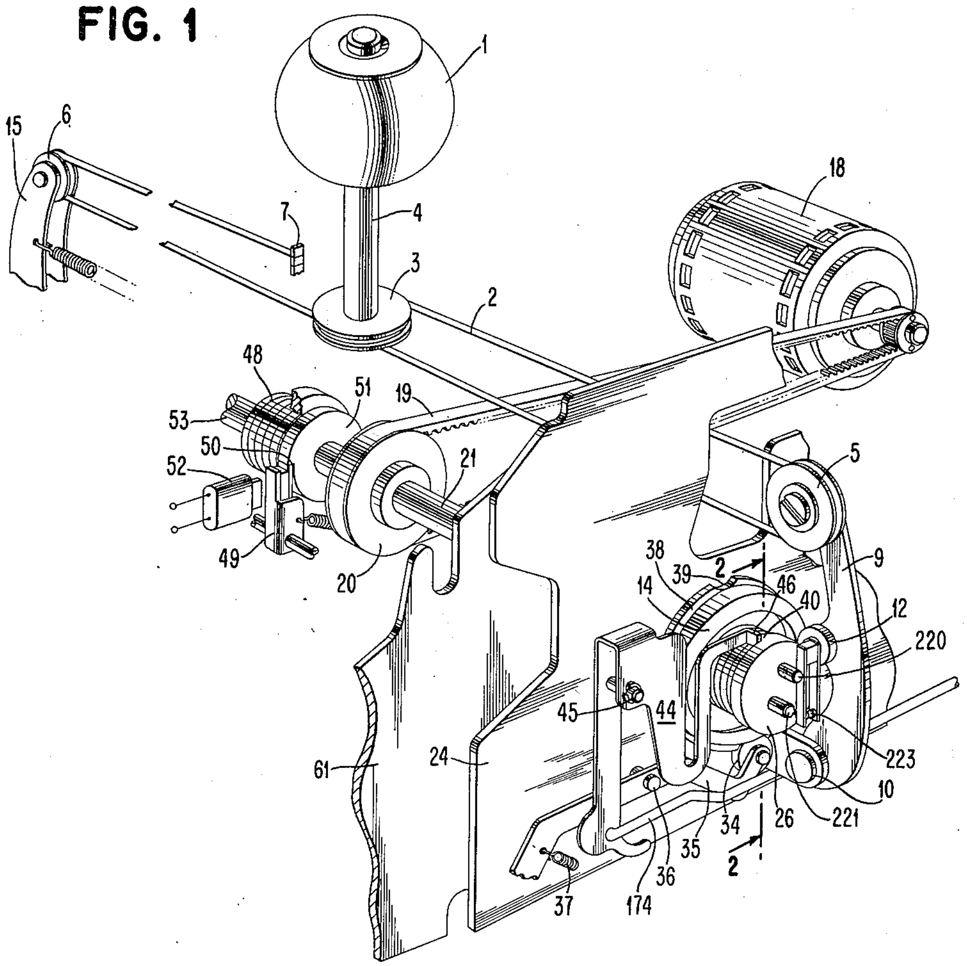
FIGURE 1 is a perspective view showing a portion of a typewriter with a mechanism for shifting it between lower and upper case positions.

There is shown in the drawings a mechanism which operates in response to the reading of information from a punched tape to cause an operation of a typewriter or printer to print the information. The typewriter, a portion of which is shown in FIGURE 1, is like the typewriter shown and described in U.S. Patent 2,919,002 to Leon E. Palmer, except for a few changes adapting it for operation under control of the mechanism associated with it.

This typewriter has a single print head or matrix 1 on which lower case characters are formed about half its surface and upper case characters are formed about the opposite half. The head may be rotated from one to five units in either direction from home positions to select either lower or upper case characters for printing. A tilting of the head may also be obtained to select any one of several rows of characters extending about its surface. Basic character selecting mechanisms for rotating and tilting the head are shown in the above-mentioned patent and need not be described here since they form no part of the present invention. It is only necessary to state that rotation of the head 1 is effected by a tape 2 connected at one end to a pulley 3 mounted on the lower end of a spindle 4 which carries the head. The tape passes about pulleys 5, 6 and is connected at its opposite end to an anchor 7. Pulley 5 is mounted on an arm 9 which is pivotally supported at 10 and carries a roller 12 engageable with a face cam 14 of shift means for determining which half of the print head 1 is presented for character selection. Acting on the pulley 3 is a spring (not shown) tending to rotate the pulley in a counterclockwise direction so as to maintain a tension on the tape.

When the cam 14 is in a position with the roller 12 engaging a low point in its surface, the type head is in a home position with a point midway between the edges of the lower case portion lying in front of the platen. The pulley 6 is mounted on an arm 15 which can be swung in either direction varying distances for rotating the head 1 to select any one of various lower case characters for printing. Swinging of the arm 15 takes place in response to the rocking of permutation bails or members 16 (FIGURES 7) singly or in combination. The mechanism which operates from the rocking of the bails to swing the arm is described completely in the patent mentioned above. If the cam 14 is rotated 180° to bring a high point on its surface under the roller 12, the arm 9 is swung outwardly and the print head is rotated 180° to another home position in which a point midway between the ends of the upper case portion is opposite the platen. A swinging of the arm 15 varying distances will now select different upper case characters for printing.

Figure 2:
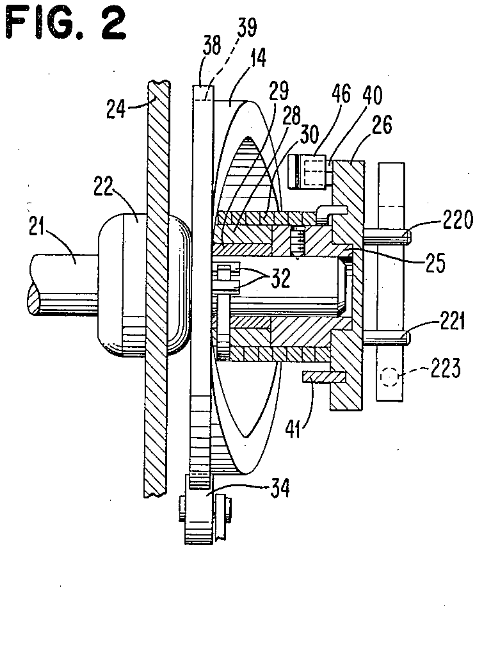
FIGURE 2 is an enlarged view, partially in section, taken on the line 2—2 of FIGURE 1 and showing the clutch mechanism for effecting case shift.

For driving the cam 14 to selectively operate the shift means, there is provided a motor 18 which operates through a belt 19 to drive a pulley 20 fixed on a shaft 21. As shown in FIGURE 2, the shaft 21 is rotatably supported in a bearing 22 carried by a side plate 24 on the typewriter. Keyed to the end of the shaft is a bearing sleeve 25 on which an annular member 26 rotates freely. Formed on the cam 14 is a hub portion 28 rotatably mounted on a sleeve 29 fixed to the shaft 21. Surrounding the hub portion 28 and an enlarged portion of the bearing sleeve 25 is a helical clutch spring 30 having one end fixed to the member 26 and its opposite end fixed between lugs 32 projecting from the cam 14. When the member 26 is free to turn on the shaft 21, the spring 30 grips the sleeve 25 and the hub portion 28 to drive the cam. A detenting roller 34 is carried by an arm 35 pivoted at 36 and urged by a spring 37 in a direction to engage the roller with a plate 38 which rotates with the cam 14. Formed in the plate 38 are notches 39 which receive the roller when the cam is in positions presenting either its high point or its low point to the roller 12. Fixed on the member 26 at diametrically opposite points are lugs 40 and 41 which are spaced different radial distances from the axis of the shaft 21. A lever 44 is pivotally supported at 45 and has an offset portion 46 which is movable into the paths of the lugs 40, 41.

With the offset portion engaged by one of the lugs and the roller 34 in one of the notches 39, the clutch spring 30 is held expanded so the cam 14 is free of the shaft 21. If the lever 44 is now rocked to move its offset portion from the path of the engaged lug into the path of the other lug, the clutch spring will operate to drive the cam 14 until the other lug engages the offset portion to expand the clutch spring again. The cam continues to turn under inertia until the roller 34 drops into the next notch 39 and holds the clutch spring expanded. It will be seen that the cam is driven 180° and will present either the high or low points on its surface to the roller 12.

The driving of mechanisms for rotating or tilting the print head 1 in response to a rocking of the bails 16 is accomplished by a spring clutch 48 (FIGURE 1). This clutch is normally held disengaged by an armature 49 engaging a shoulder 50 on a rotatable member 51. When a magnet 52 is pulsed, the armature is momentarily moved out of the path of the shoulder and permits the clutch to operate for connecting a shaft 53 in driven relation with the shaft 21. As soon as the shaft 53 is driven one revolution, the armature 49 engages the shoulder 50 and disengages the clutch. During this time, the machine has gone through one cycle to select a character and print it. Included in the mechanisms driven by the shaft 53 is a filter shaft 55 (FIGURE 7) which rotates 180° on each revolution of the shaft 53. The filter shaft is described in the Palmer patent as operating interposers to rock the bails 16. This shaft is not used to drive the bails in the present arrangement, but is used only to drive cyclically operating cams 56 and 57 mounted thereon. Cam 56, as shown in FIGURE 6, acts on a roller 58 carried by a bar 60 slidably mounted on a side plate 61 of the typewriter. A spring 62 urges the bar in a direction to engage the roller 58 with the cam so a rotation of the latter 180° causes the bar to make one complete reciprocation. Pivotally mounted on the bar are latches 64 cooperating with arms 65 fixed to the ends of the bails 16 as shown. A downwardly projecting portion of each latch has an offset portion 66 which is normally held in engagement with one end of a flexible element 68 under the action of a spring 69. The other end of the element 68 is connected to a bracket 70 fixed to the bar 60. Located beneath each of the flexible elements 68 is a finger 72 connected to a shaft 73 which may be rotated by mechanisms to be described later for driving its finger against the element to move the latter out of the path of the offset portion 66. Spring 69 then rocks the latch 64 to a position in which it engages the lower end of the associated arm 65. If the bar 60 is then moved to the left by the cam 56, the arm 65 is operated to rock the bail 16 on which it is mounted, thereby causing an operation of the print head for selecting a character to be printed. As the bar 60 moves to the right, upwardly projecting arms 72 on the latches engage stationary lugs 73 for rocking the latches to the positions shown in FIGURE 6. It will be seen that the foregoing mechanism comprises permutation data storage means for transferring data between the reader and the typewriter.

Arranged at the side of the typewriter adjacent the plate 61 and connected to the latter by any suitable means, not shown, is a control unit 75 (see FIGURES 3*a* to 5) which operate in response to a source of character representative data, e.g., a punched tape 76 that is read to rock the bails 16, energize the clutch magnet 52, and actuate the lever 44 to control the clutch spring 30. This unit comprises a frame including a plate 78 which is arranged parallel to the side plate 61 of the typewriter. Journaled in the plate 78 is a shaft 79 (FIGURE 3*b*) which may be driven through a magnetic clutch 80 from a power shaft 81. Fixed to the shaft 79 is a bevel gear 83 meshing with a bevel gear 84 on a shaft 85 which is rotatably supported by plates 86, 87, 88 and 89 connected to the plate 78 and extending perpendicular thereto. Mounted on the left end of the shaft 85 is a bevel gear 90 meshing with a bevel gear 91 on a shaft 92 which is journaled in plates 93 and 94. Arranged on the shaft 92 are cams 95 (FIGURE 4*a*) controlling elements 96 pivoted on a rod 97 and engageable with the tape 76 for sensing holes therein. The tape has, as shown in FIGURE 3*a*, six index points at which holes may be formed to represent various characters. Separate hole combinations are not provided for causing printer shift.

An element 96 is arranged for sensing the tape at each of its index positions. Along the center line of the tape are feedholes 98 engagable by a sprocket wheel 100 for advancing the tape under the sensing elements. The sprocket wheel is mounted on a shaft 101 supported by the plates 93 and 94. Fixed to the shaft 101 is a ratchet 102, FIGURE 9, which is engaged by a pawl 103 pivotally mounted on one arm of a bellcrank 105. The ballcrank is freely mounted on the shaft 101 and has another arm carrying a roller 106 which is held in engagement with a cam 107 on shaft 92 under the action of a spring 108. Each rotation of the shaft 92 causes the bellcrank 105 to be actuated for rotating the shaft 101 to advance the tape 76 a distance of one character space.

Pivotally mounted on each of the sensing elements 96 is a dog 110 (FIGURE 4*a*) which is normally held in the position shown by a spring 111. In the same vertical plane with each dog is a lever 112 rotatably mounted on a rod 114. A spring 115 tends to rotate each lever in a counterclockwise direction, but the dog normally engages its lower end and holds it in a vertical position. As the shaft 92 rotates in a clockwise direction, the sensing element 96 are released by the cams 95 so they can drop, under action of the springs 111, through holes in the tape if any exist therein. When a sensing element moves through a hole in the tape, its dog 110 is disengaged from the lever 112 so it can pivot in a counterclockwise direction under the action of the spring 115. Those elements not sensing holes are held by the tape in positions shown for blocking the levers against rotation.

Arranged in horizontal planes adjacent the top ends of the levers 112 are two sets of elongated strips or slides 118 carried, as shown in FIGURE 5, by comb-shaped guide members 119, 120 and a plate 121 which are mounted on the frame plates 87 and 88. One set of the slides or translating means, shown more in detail in FIGURES 8*a*, 8*b* and numbered 123, is arranged between the guide member 120 and the plate 121, while the other set or encoding means numbered 124 is arranged between the guide members 119, 120. Formed in the plate 121 are openings in alignment with the spaces between the teeth of the guide combs, and extending into each of these openings is a sensing pin or selectively activatable control member 126. Arms 127 and 128 are fixed to a shaft 130 which is rotatably supported at its ends by the plate members 87 and 88. Carried by the arms at their outer ends is a rod 131 extending through elongated slots 132 in the sensing pins. Each of the arms also carries a roller 134 which engages a cam 135 on the shaft 85. Fixed to the plate members 87 and 88 is a bar 137 having a comb-shaped spring element 138 clamped to its upper surface. Spring fingers 140 on the element 138 act on the lower ends of the sensing pins 126 for urging the latter upwardly. When the rollers 134 engage high points on the cams 135, the rod 131 acts against the sensing pins at the lower ends of the slots 132 and holds the pins in position with their upper ends extending into the openings in the plate 121 to a point just below the slides 123.

The number of spaces between the teeth of the guide combs is such that one control member 126 is provided for each character to be read from the tape and typed, including upper and lower case characters. The control members 126 are grouped or classified either 126*a* for lower case and 126*b* for upper case according to the position of their corresponding character on the print head 1 (see FIGS. 8*a* and 8*b*). Referring to FIGURES 8*a* and 8*b* it will be noted that the set of slides 123 are provided with openings 142 which are normally out of vertical alignment at each of the different character positions. When these slides are moved to the left in a combination representative of any character, the openings 142 at that character position come into alignment over the corresponding sensing pin 126. The openings 142 at all of the other character positions will still be out of alignment. For moving the slides 123 to the left, there is provided on each slide at its left end a reduced portion 143 having an opening 144 through which the upper end of one of the levers 112 extends as shown in FIGURE 4*a*. The portions 143 are offset from each other so they receive the levers 112 while the slides remain in vertical alignment. When one of the sensing elements 96 drops into a hole in the tape 76, the lever 112 associated therewith is rocked by its spring 115 to move the connected slide 123 to the left.

Among the set of slides 124 are six, numbered 124*a*, which operate in a manner to be described for rocking the bails 16 of the typewriter. Two more slides designated 124*b* cooperate with a latch 184 to provide bistable means for controlling shifting of the typewriter between lower and upper case positions. At any given time, latch 184 restrains one of the slides 124*b* while permitting the other to move as hereinafter explained. The slides 124*a* are provided at each character position with either openings 146 just large enough to receive a sensing pin or with openings 147 long enough to permit movement of the slides relative to a pin when the latter extends through them. The openings 146, 147 are normally aligned vertically along their left hand edges so a sensing pin may pass through them after it passes through the openings 142 in the slides 123.

One of the slides 124*b* designated "UPPER" operates the clutch spring 130 (FIGURE 2) for shifting the typewriter from lower to upper case position while the other slide designated "LOWER" operates the spring to shift from upper to lower case position. The "LOWER" slide 124*b* is provided with an elongated slot 149 which extends throughout the lower case character positions so this slide will not be held by any of the sensing pins 126*a* corresponding to lower case characters. The portion of this slide opposite upper case character positions has openings 150 through which the sensing pins 126*b* corresponding to upper case characters may move for holding it against movement. In the "UPPER" slide 124*b* are openings 151 at lower case character positions for receiving sensing pins 126*a* corresponding to lower case characters for holding it against movement and an elongated slot 152 at upper case character position for receiving sensing pins 126*b* corresponding to upper case characters without affecting its movement. Accordingly, the coding of holes in slides 124*b* provide means responsive to actuation of an upper case pin 126*b* or a lower case pin 126*a* for causing the bistable means provided by slides 124*b* and latch 184 to operate in a corresponding state.

Each of the slides 124*a* has at its left end an opening 154 through which an arm 155 extends. All of the slides other than the one with an opening 154 has a slot 157 through which the arms 155 extend without affecting their movement in either direction. The arms 155 are connected at their lower ends to the shafts 73 (FIGURE 4*a*) which are journaled in a frame plate 158 and the plate 78 as shown in FIGURE 3*a*. It will be remembered that these shafts operate to control the latches 64 as shown in FIGURES 6 and 7, whereby bails 16 are operated in response to the activation of individual control members 126 for operating the basic selecting mechanism. Mounted on the frame plate 158 are springs 160 acting on the arms 155 for urging the latter in a counterclockwise direction. Connected to the left ends of the slides 124*b* are springs 161 for urging them to the left.

At the right ends of all the slides 123 and 124 are slots 163 through which a pin 164 extends. This pin is mounted on a lever 165 which is pivotally connected to a bracket 166 (FIGURE 3*b*) extending from the plate 86. At the inner end of the lever is a roller 167 engaging a cam 168 fixed to the shaft 85. The roller normally engages a high point on the cam for holding the lever 165 in a position to engage the pin 164 with the slides at the right ends of the slots 163 so as to maintain them in their home positions against the action of the various springs tending to move them to the left as described above.

Arranged just to the left of lever 165 is another lever 169 controlled by a cam 170 on the shaft 85 and carrying a pin 171 which extends through slots 172 in the slides 123 and slots 173 in the slides 124. The slots 172 are formed to permit free movement of the slides 123 relative to the pin 171, and the slots 173 are formed so the slides 124 engage the pin 171 at the right ends of the slots. Cam 170 is formed to permit movement of the pin 171 to the left shortly after the pin 164 has been moved in this direction. Movement of the pin 164 frees the slides, but only the slides 123 can move since the slides 124 are still held by the pin 171.

As shown in FIGURE 1, this cam 14 is in a position with a high point on its surface acting against the roller 12 for holding the arm 9 rocked outwardly to locate the upper case portion of the type head in typing position. The bellcrank 44 engages the outermost lug 40 to maintain the clutch spring 30 released. Movement of the bellcrank 44 to the position engaging the lug 40 was effected by a link 174 attached to the bellcrank and moved to the right. Pivotally connected to the opposite end of the link is a lever 175 (FIGURE 3*b*) mounted on a pivot pin 176 carried by a plate 177. Mounted on the lever 175 at its end opposite the link 174 is a lug 178 to which a toggle spring 179 is connected for holding the lever in either position to which it may be moved. Extending downwardly from the lever at opposite sides of the pivot pin 176 are two studs 180 and 181 (FIGURES 3*b* and 8*b*) lying in the paths of tooth-like projections 182 and 183 on the "LOWER" and "UPPER" slides 124*b*, respectively. With the lever 175 in the position shown, it is evident that the "LOWER" slide must be moved to the left for swinging the lever to its opposite position. This causes an actuation of the link 174 for swinging the bellcrank 44 in a clockwise direction to position it in front of the stud 41. The clutch spring 30 then operates to drive the cam 14 until the stud 41 engages the bellcrank and causes a release of the clutch. A low point on the cam is then engaged by the roller 12 and the type head 1 presents lower case characters to the platen.

The latch 184 (FIGURES 3*b* and 4*b*) is fixed to a pivotally supported member 185 and extends through slots 186 in the slides 124*b* for engagement selectively with shoulders 187 and 188 on the "LOWER" and "UPPER"

slides, respectively. An arm 190 is fixed to the member 185 and has a toggle spring 191 connected to it for holding the latch 184 in engagement with one or the other of the shoulders 187, 188. Projecting upwardly from the member 185 at opposite sides of its pivot support are two studs 192 and 193 which are engageable by shoulders 194 and 195 on the "LOWER" and "UPPER" slides, respectively.

As shown in FIGURE 3*b*, the latch 184 engages the shoulder 188 for holding the "UPPER" slide against movement to the left. If the positioning of the slides 123 is such that a sensing pin 126*b* moves upwardly at some one of the upper case character positions, then the "LOWER" slide is held by the sensing pin engaging one of the holes 150 and the "UPPER" slide is held by the latch 184. Since neither of the slides 124*b* can move, the typewriter operates to type an upper case character. If the positioning of the slides 123 has been such that a sensing pin 126*a* moved upwardly at one of the lower case positions, then this pin would pass through an opening 151 in the "UPPER" slide and the slot 149 in the "LOWER" slide. The "UPPER" slide would then be held by both the sensing pin and the latch 184, but nothing would hold the "LOWER" slide when it was released by a rocking of the lever 165. The "LOWER" slide would then move to the left and actuate mechanisms to be described for engaging the clutch spring 130 and causing a rotation of the type head to a position for selecting lower case characters. The bistable means provided by slides 124*b* and latch 184 would also be caused to operate in its other state wherein latch 184 holds the "LOWER" slide.

At the left ends of the slides 124*b* are slots 198, 199 (FIGURE 8*a*) through which a shift clutch operating pin 200 extends. When these slides are in their home positions, the right ends of the slots normally engage the pin 200. Movement of either slide 124*b* to the left, as upon a change of state of the bistable means, will cause the pin to move with it. In the slides 123 are slots 201 through which the pin 200 extends without engaging the slides at the ends of the slots in any of the positions which may be assumed either by the pin or the slides 123. Pin 200 is mounted at its lower end on a bellcrank 202 (FIGURE 3*a*) which is pivotally supported at 203. One arm of the bellcrank acts on a contact 204 for transferring it from normal engagement with a contact 205 to engagement with a contact 206. Another arm of the bellcrank acts on a pivoted dog 207 for holding it in the position shown against the action of a spring 208. A link 210 connects the dog to a lever 211 (FIGURE 9) lying in the path of a stud 212 on a disk 214 mounted on the shaft 92.

As one of the slides 124*b* moves to the left it rocks the bellcrank 202 for transferring the contact 204 of a print cycle delay circuit into engagement with the contact 206. The dog 207 is then freed by the bellcrank and is moved by the spring 208 into a position for holding the bellcrank 202 in the position to which it was moved. Slide 124*b* may then be returned to its home position, but the contact 204 is held transferred until the stud 212 operates near the end of a machine cycle to rock the lever 211 counterclockwise for withdrawing the dog 207 and permitting the return of the contact 204 into engagement with the contact 205. Contact 204 is spring urged toward the contact 205 and rocks the bellcrank into the path of the dog when it is free of the latter.

Contact 204 is connected, as shown in FIGURE 10, to one terminal of the clutch magnet 52, and the other terminal of this magnet is connected to a supply conductor 215 leading to the negative side of a voltage source.

Mounted on the shaft 85 (FIGURE 3*b*) is a cam 217 which operates at a predetermined point in each machine cycle to close a pair of contacts 218. A shown in FIGURE 10, the contacts 218 are connected in a circuit extending from the positive side 219 of the power source to the contact 205.

Projecting from the member 26 (FIGURES 1 and 2) are studs 220, 221 which operate near the end of a case shift operation to close momentarily a pair of contacts 223. These contacts are connected in a circuit extending from the power conductor 219 to the contact 206. Accordingly, operation of clutch magnet 52 and rotation of cam 56 is prevented so long as contacts 204 and 223 are open.

The cam 57 (FIGURE 7) on the filter shaft 55 operates near the end of a typing cycle to close a pair of contacts 225. These contacts are connected in a circuit extending from the power conductor 219 through a conductor 226, a conductor 227, a pair of contacts 228 and the magnetic clutch 80 to the negative conductor 215. The contacts 228 are spring urged into engagement with each other, but are normally held open by a latch 229 mounted on a pivot pin 230. Also mounted on the pin 230 is a lever 231 having a lug 232 engaging the latch 229 for moving it out of engagement with the contacts 228 against the action of a spring 234. A start key 235 carries a hook-shaped spring arm 236 engaging the outer end of the lever 231 for rocking it downwardly when the start key is depressed. A stud 237 acts to move the arm 236 free of the lever 231 when the key is depressed. As the lever is rocked downwardly, the latch 229 is released from the contacts 228 permitting them to close and then the arm 236 is disengaged from the lever so the latter is rocked upwardly under the action of the spring 234. The upper end of the latch 229 is inclined at 238 for camming the movable one of the contacts 228 into engagement with the other. A stop key 240 may be operated manually for forcing the movable contact 228 out of engagement with the other. At this time the latch 229 engages the movable contact and holds it in open position. Arranged below the lever 231 is a pair of contacts 241 which are closed by the lever as it is rocked downwardly. One of the contacts 241 is connected by a conductor 242 to the conductor 227, and the other contact is connected to the conductor 226.

The operation of the mechanism described is as follows: Assuming that the machine is stopped and that the case shift cam 14 is in the position shown for holding the type head 1 in position to print upper case characters. A depression of the start key results in a closing of the contacts 228 and 241 for energizing the clutch 80 through a circuit extending from the line 219 through conductor 226, contacts 241, conductors 242, 227, contacts 228 and the clutch 80 to the line 215. It will be noted that the contacts 241 open again soon after closing and break the circuit to the clutch. This clutch, however, is of the one-revolution type and remains engaged after pulsing until the shaft 79 has been driven one revolution. As the shaft 79 rotates and drives the cams 95 (FIGURE 4*a*), the sensing elements 96 are released to engage the tape 76. Those elements sensing holes drop through and release their levers 112 which tend to swing counterclockwise and move corresponding slides 123. Simultaneously, with the sensing of the tape the cam 168 permits the lever 165 to swing and free the slides. Any of the slides 123 corresponding to elements sensing holes in the tape are then moved to the left and align the openings 142 at the character position corresponding to the character sensed. As soon as the slides 123 have been moved, the cams 135 permit a rocking of the arms 127 for freeing the sensing pins 126. The spring fingers 140 then lift the sensing pins, but only the one at the character position with aligned openings can move upwardly through the slides. Since the slides 124*a* and 124*b* are still held in home positions, and the openings in them are vertically aligned, the sensing pin 126 passing through openings in the slides 123 will also pass through openings in the slides 124.

With one of the sensing pins 126 extending through openings in all of the slides, the lever 169 is permitted to swing for freeing the slides 124. Those slides 124*a* having large openings 147 for receiving the sensing pin will move to the left under the action of the spring arms 155. A swinging of these arms causes the shaft 73 to rotate and effect a movement of the latches 64 (FIGURE 6) into the path of the arms 65 on the bails 16.

Assuming that the character sensed in the tape is in upper case, the pin **126*b* moving upwardly will be at an upper case character position and will pass through the slot 152 in the "UPPER" slide 124*b* and a small opening 150 in the "LOWER" slide 124*b*. It will be noted that the sensing pin will now hold the "LOWER" slide against movement while the latch 148 holds the "UPPER" slide. The contact 204** (FIGURE 3*a*) remains in the position shown since the pin 200 is not actuated by one of the slides **124*b***.

Cam 217 on shaft 85 now closes the contacts 218 and, as shown in FIGURE 10, a circuit is completed through contacts 218, 205, 204 and the clutch magnet 52. Shaft 53 (FIGURE 1) is now driven one revolution and causes the filter shaft 55 (FIGURES 6 and 7) to turn 180°. Cam 56 on the filter shaft operates to drive the bar 60 to the left and effect a rocking of any bails 16 whose arms 65 are engaged by the latches 64. This causes an operation of the print head 1 to select and print the character read from the tape. Just before the filter shaft completes its 180° of rotation, the cam 57 on this shaft closes the contact 225 for completing a circuit through contacts 225, 228 and the clutch 80. Another cycle is started to read the tape which was advanced by the pawl 103 acting on the ratchet 102 just after the sensing of the tape was completed during the previous cycle. As the tape is moved to each reading position, it is detented in that position by a spring operated roller 245 (FIGURE 3*a*) engaging a notched wheel 246 fixed to the shaft 101 carrying a feed roll for the tape. If the next character read is also upper case, another operation like that described above takes place.

If the next character read is in lower case, the sensing pin **126*a* moving upwardly will be at a lowercase character position and will pass through a small opening 151 in the "UPPER" slide 124*b* and the slot 149 in the "LOWER" slide. The "UPPER" slide will now be held both by the sensing pin and the latch 184, but nothing is holding the "LOWER" slide. As soon as the slides 124 are freed by a swinging of the lever 169, the slides 124*a* move to set up the latches 64 for the bails 16. The "LOWER" slide moves at the same time and operates the pin 200** (FIGURE 3*a*) for transferring the contact 204 into engagement with the contact 206. The clutch magnet 52 cannot be energized now on a closing of the contacts 218 by the cam 217.

As the "LOWER" slide moves to the left, its shoulder 182 acts on the stud 180 to rock the lever 175 counterclockwise. This operates through the link 174 to move the bellcrank 44 into the path of the stud 41 on the member 26. The clutch spring 30 operates to drive the cam 14 and the member 26 until the engagement of the stud 41 with the bellcrank causes the clutch spring to be released. Cam 14 is now in a position to locate the type head for lower case printing. Just before it arrives at that position, one of the studs 220, 221 closes the contacts 223 and completes a circuit through these contacts and the contacts 206, 205 to the clutch magnet 52. This causes the clutch 48 to operate for driving the typewriter through a cycle to select and type the character read from the tape. It will be noted that the latches 64 set up by movement of the slides **124*a* remain in their set positions while the cam 14 is driven to shift the print head from upper to lower case printing. If the following characters read from the tape are lower case, the operation is the same as that first described for causing a selection and printing of characters soon after the slides 124*a* are moved. When an upper case character is again read, the "UPPER" slide moves with the slides 124*a* transferring the contact 204** and causing a shift to upper case before printing takes place.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A mechanism operable in response to the sensing of holes in a punched record for effecting operation of a typewriter to print characters corresponding to the combinations of holes sensed comprising, in combination:

a print head having characters formed on its surface, a plurality of members movable either singly or in combination for effecting operation of said print head to move characters selectively into printing position, a control element cooperating with each of said members and shiftable between inactive and active positions, a set of slides, one for each of said control elements, movable from a home position to an operating position, means actuated on movement of said slides to operating positions for shifting said control elements from inactive to active positions, a plurality of control members cooperating with said slides at different points corresponding to different characters, elements for sensing holes in said record, means operating on the sensing of holes representative of any character for moving the one of said control members at the corresponding character position into an operative position for controlling said slides, each of said control members acting when in an operative position to hold one or more of said slides, means operating after movement of one of said control members to its operative position for moving all of said slides not held thereby to their operating positions, means operating after said slides have been moved for engaging said control elements in active positions with said movable print head operating members to actuate the latter, said last-named means comprising:

a bar movable longitudinally in a plane including said print head operating members, means mounting said control elements on said bar for movement between inactive and active positions relative to said print head operating members, and said means for engaging said control elements with said movable print head operating members comprising a cam operable to effect a reciprocation of said bar, a continuously driven power shaft, means including a magnetic clutch which operates when energized to drive said cam from said power shaft for effecting a single reciprocation of said bar, and means for energizing said clutch after said slides have been moved to their operating positions.

2. A mechanism operable in response to the sensing of holes in a punched record for effecting operation of a typewriter to print characters corresponding to the combinations of holes sensed comprising, in combination:

a print head having lower case characters formed about one portion of its surface, and upper case characters formed about another portion of its surface, a plurality of members movable either singly or in combination for effecting operation of said print head to move characters selectively into printing position, a control element cooperating with each of said members and shiftable between inactive and active positions, a set of slides, one for each of said control elements, movable from a home position to an operating position,
means actuated on movement of said slides to operating positions for shifting said control elements from inactive to active positions,
a plurality of control members cooperating with said slides at different points corresponding to different characters,
elements for sensing holes in said record,
means operating on the sensing of holes representative of any character for moving the one of said control members at the corresponding character position into an operative position for controlling said slides, each of said control members acting when in an operative position to hold one or more of said slides,
means operating after movement of one of said control members to its operative position for moving all of said slides not held thereby to their operating positions,
means operating after said slides have been moved for engaging said control elements in active positions with said movable print head operating members to actuate the latter,
means including a clutch for shifting said head to present either lower case or upper case characters in printing positions,
means including a pair of slides for actuating said clutch, said pair of slides being movable individually from a home position to an operating position for causing engagement of said clutch,
said control members at lower case character positions acting when moved to operative positions to hold one of said pair of slides while those at upper case character positions operate to hold the other of said pair of slides,
a latch engagable with either one of said pair of slides for holding it against movement,
means operating on movement of one of said pair of slides for engaging said latch therewith when moved to its home position,
means operative after movement of one of said control members to its operative position for moving either one of said pair of slides not held to its operating position, and
means actuated by either one of said pair of slides when moved to its operating position for delaying engagement of said control elements with said movable print head operating members until said print head has been shifted.

3. The mechanism of claim 2 in which one of said pair of slides is provided with openings at lower case character positions adapted to receive associated control members for holding it against movement, and the other of said pair of slides is provided with openings at upper case character positions adapted to receive control members for holding it against movement.

4. A mechanism connected to a typewriter and operating in response to the sensing of holes in a tape representative of either lower case or upper case characters for causing a case shift by the typewriter on the sensing of holes for a character different from that of the next preceding character sensed comprising, in combination:
means including a clutch which is operable when engaged for shifting said typewriter from one case position to another,
a pair of slides movable from home positions to operating positions,
means actuated by either one of said slides on moving to its operating position for engaging said clutch,
a plurality of control members cooperating with said slides at different points corresponding to different characters,
elements for sensing holes in said tape,
means operating on the sensing of holes representative of any character for moving the one of said control members at the corresponding character positioned into an operative position for controlling said slides, each of said control members at positions corresponding to lower case characters acting when in its operative position for holding one of said slides and those at upper case positions acting to hold the other of said slides,
a latch engageable with either one of said slides for holding it against movement,
means operating on movement of one of said slides for engaging said latch therewith when moved to its home position,
and means tending to move said slides to their operating positions after one of said control members has been moved to its operative position.

5. The mechanism of claim 4 in which one of said pair of slides operates to engage said clutch for shifting said typewriter to upper case position and the other operates said clutch to shift said typewriter to lower case position, said slide effecting an upper case shift having, at each point opposite a control member in lower case position, an opening through which such control member extends for holding it against movement and said slide effecting a lower case shift having, at each point opposite a control member in upper case position, an opening through which such control member extends for holding it against movement.

6. A mechanism operable in response to the sensing of holes in a punched record for effecting operation of a typewriter to print either lower case or upper case characters corresponding to the combination of holes sensed comprising, in combination:
a print head having lower case characters about one portion of its surface and upper case characters about another portion,
means including a first clutch for shifting said head to present either portion of its surface for the selection of characters to be printed,
a plurality of members movable either singly or in combination for effecting operation of said print head to select characters from either portion of its surface presented,
a control element cooperating with each of said members and shiftable between inactive and active positions,
a set of slides, one for each of said control elements, movable from a home position to an operating position,
means actuated on movement of said slides to operating positions for shifting said control elements from inactive to active positions,
means including a pair of slides for actuating said clutch, said pair of slides being movable individually from a home position to an operating position for causing engagement of said clutch,
a plurality of control members cooperating with said set of slides and said pair of slides at points corresponding to both lower case and upper case characters,
elements for sensing holes in said record,
means operating on the sensing of holes representative of any character for moving the one of said control members at the corresponding character position into an operative position for controlling said slides, each of said control members acting when in an operative position to hold one or more of said set of slides and one or the other of said pair of slides,
a latch engageable with either one of said pair of slides for holding it against movement,
means operating on movement of either one of said pair of slides for engaging said latch therewith when moved to its home position,
means operating after movement of one of said control members to its operative position for moving all of said slides not held to their operating positions, means including a second clutch operable to engage said control elements in active positions with said movable members to actuate the latter, and means operating when each of said pair of slides is held and the slides of said set of slides not held have been moved for operating said second clutch.

7. The mechanism of claim 6 in which said second clutch is electrically actuated;

means including a transfer contact connected to said second clutch for energizing the latter, a first pair of normally open contacts, means for closing said first pair of contacts shortly after said slides have been moved to their operating positions, a second pair of contacts, means driven with said head shifting means for closing said second pair of contacts just before the shifting of said head has been completed, means connecting one side of said first and second pairs of contacts to a voltage supply, means normally engaging said transfer contact with the other side of said first pair of contacts, and means actuated by either one of said pair of slides on movement to its operating position for shifting said transfer contact into engagement with the other side of said second pair of contacts.

8. A mechanism operable in response to the sensing of holes in a punched tape for effecting an operation of a typewriter to print characters corresponding to the combinations of holes sensed comprising, in combination:

a print head having characters formed on its surface, a plurality of members movable either singly or in combination for effecting operation of said print head to move any character into printing position, elements for sensing holes in said tape, a first set of slides, each associated with a different one of said sensing elements, said slides being movable from a home position to an operating position on the sensing of a hole by the sensing element associated therewith, a second set of slides, each associated with a different one of said movable members, a control element cooperating with each of said movable members and shiftable between inactive and active positions, each of said second set of slides being movable from a home position to an operating position, means actuated by each of said second set of slides when moved to its operating position for shifting said control element of said member associated therewith from its inactive to its active position, sensing pins cooperating with said slides at different character positions, said first set of slides having openings normally out of alignment with each other at each character position but shifting into alignment, on movement of said slides, at the character position corresponding to that of the slides moved, means for engaging said sensing pins with said first set of slides so that a sensing pin passes through aligned openings at any character position, said second set of slides having openings at each character position in alignment with each other when said slides are in their home positions, said last mentioned openings receiving any sensing pin passing through openings in said first set of slides and being of such length that each of said second set of slides is either held against movement or is permitted to move to its operating position, means operating after a sensing pin has been passed through openings in said second set of slides for moving those of such slides not held, and means operating after said second set of slides have been moved for engaging said control elements in active positions with said movable members to actuate the latter.

9. The mechanism of claim 8 in which said print head has lower case characters formed on one portion of its surface and upper case characters formed on another portion:

means including a clutch for shifting said head to present either portion of its surface for the selection of characters, means including a pair of slides for controlling said clutch, each of said pair of slides being movable from a home position to an operating position for engaging said clutch to effect a shifting of said head, one of said pair of slides having openings at lower case character positions for receiving any sensing pin at such positions passing through openings in said first set of slides, the other of said pair of slides having openings at upper case character positions for receiving any sensing pin at such positions passing through openings in said first set of slides, said sensing pins operating to hold either of said pair of slides when extending through openings therein, a latch engageable with either one of said pair of slides for holding it against movement, and means operating on movement of either one of said pair of slides to its operating position for engaging said latch therewith when moved to its home position.

10. The mechanism of claim 9 in which said means for engaging said control elements with said movable members includes:

an electrically operated clutch, means including two pairs of normally open contacts for controlling the energizing of said electrically operated clutch, means for closing one pair of said contacts just after either one of said pair of slides has moved to its operating position, means for closing the other pair of said contacts just before the shifting of said head has been completed, means normally connecting said electrically operated clutch to said one pair of contacts, and means operating on movement of either one of said pair of slides to its operating position for connecting said electrically operated clutch to said other pair of contacts.

11. In a printer including print head means having characters thereon for impact printing, the print head means being controllable by a source of character representative data in a code form characterized by the absence of shift codes, the printer further including basic character selecting mechanism and separate shift means having at least two operating states and operable conjointly with the selecting mechanism for selecting individual characters of the print head means for printing, whereby the total available print characters are divided into at least a pair of case groups classified according to the shift state required for their selection, the control means comprising:

a first group of selectively activatable control members individually corresponding to characters on the print head means selectable by the basic character selecting mechanism when the shift means is in one of its operating states, a second group of selectively activatable control members corresponding individually to characters on the print head means selectable by the basic character selecting mechanism when the shift means is in the other of its operating states, means responsive to activation of a control member in either of said first and second groups for operating the basic selecting mechanism, translating means responsive to individual character data received from the source for selectively activating a control member in one of said first and second groups corresponding to the individual character code received, bistable means capable of remaining in either of two operating states, means responsive to the activation of any element in said first group for causing operation of said bistable means in one of its states, and responsive to activation of any element in said second group for causing operation of said bistable means in the other of its states, means for selectively operating said shift means for causing a change of operating state of said shift means, and means responsive to the change of said bistable means from one operative state to the other for operating said selectively operable means.

12. A printer as defined in claim 11 wherein said print head means comprises a character print matrix and said means for operating the basic selection mechanism comprises, permutation means for selecting individual characters on said print matrix for printing, permutation data stroage means, means responsive to activation of a control element in said first and second groups for entering data into said permutation data storage means, and cyclically operable means normally operative sequentially subsequent to entry of data into said storage means for transferring data from said storage means to said permutation means, and further comprising means responsive to the change of said bistable means from one operative state to another for delaying the operation of said cyclically operable means until after the operation of said shift means has been completed.

13. A printer as defined in claim 12 wherein said source of character representative data comprises, mechanism operable in response to sensing of a record.

References Cited by the Examiner

UNITED STATES PATENTS

| | | | |
|---|---|---|---|
| 2,589,132 | 3/1952 | Przysiecki | 178—27 |
| 2,679,902 | 6/1954 | Brewer | 234—23 |
| 2,737,240 | 3/1956 | Brewer | 234—123 |
| 2,919,002 | 12/1959 | Palmer | 197—16 |
| 3,050,241 | 8/1962 | Hickerson | 234—112 X |

ROBERT E. PULFREY, *Primary Examiner.*

EDGAR S. BURR, *Assistant Examiner.*